US012506258B2

(12) United States Patent
Furuta et al.

(10) Patent No.: US 12,506,258 B2
(45) Date of Patent: Dec. 23, 2025

(54) ANTENNA DEVICE

(71) Applicants: KABUSHIKI KAISHA TOKAI RIKA DENKI SEISAKUSHO, Aichi (JP); TAIWAN INPAQ ELECTRONIC CO., LTD., Miaoli County (TW); TOYOTA JIDOSHA KABUSHIKI KAISHA, Aichi-ken (JP)

(72) Inventors: Masateru Furuta, Aichi (JP); Tadashi Fukagai, Aichi (JP); Yuki Kono, Aichi (JP); Yutaka Kubo, Aichi (JP); Taiichi Yamaguchi, Kanagawa (JP); Ta-Fu Cheng, Miaoli County (TW); Chih-Ming Su, Miaoli County (TW); Tetsuya Kobayashi, Aichi-ken (JP); Junzou Ohe, Aichi-ken (JP)

(73) Assignees: KABUSHIKI KAISHA TOKAI RIKA DENKI SEISAKUSHO, Aichi (JP); TAIWAN INPAQ ELECTRONIC CO., LTD., Miaoli County (TW); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 182 days.

(21) Appl. No.: 18/214,698

(22) Filed: Jun. 27, 2023

(65) Prior Publication Data

US 2024/0006751 A1 Jan. 4, 2024

(30) Foreign Application Priority Data

Jul. 4, 2022 (JP) ................................ 2022-107597

(51) Int. Cl.
*H01Q 1/38* (2006.01)
*H01Q 11/12* (2006.01)

(52) U.S. Cl.
CPC ............... *H01Q 1/38* (2013.01); *H01Q 11/12* (2013.01)

(58) Field of Classification Search
CPC . H01Q 1/38; H01Q 11/12; H01Q 9/04; H01Q 5/25
See application file for complete search history.

(56) References Cited

U.S. PATENT DOCUMENTS 8,462,059 B2 * 6/2013 Schnuerer ............ H01Q 1/1214 343/715
9,583,811 B2 * 2/2017 Seler ....................... H01P 5/107
2008/0198077 A1 * 8/2008 Duzdar .................. H01Q 21/30 343/715
2019/0379112 A1 12/2019 Liu et al.
2023/0058867 A1 * 2/2023 Park ..................... H01Q 1/3275

FOREIGN PATENT DOCUMENTS

JP 2019-213138 A 12/2019

* cited by examiner

*Primary Examiner* — Seung H Lee
(74) *Attorney, Agent, or Firm* — Greenblum & Bernstein, P.L.C.

(57) ABSTRACT

There is provided an antenna device comprising: a chip antenna arranged on a substrate; and a metal element arranged on the same substrate as the chip antenna, wherein the metal element is arranged such that a longitudinal direction of the metal element is vertical with respect to the substrate in a direction in which a current flows in the chip antenna.

12 Claims, 6 Drawing Sheets

ANTENNA DEVICE

CROSS REFERENCE TO RELATED APPLICATION(S)

This application is based upon and claims benefit of priority from Japanese Patent Application No. 2022-107597, filed on Jul. 4, 2022, the entire contents of which are incorporated herein by reference.

BACKGROUND

The present invention relates to an antenna device.

In recent years, wireless communication functions are implemented in various devices. Furthermore, antennas for implementing the wireless communication functions in devices are also actively developed. The above antennas include, for example, a chip antenna as disclosed in JP 2019-213138 A.

SUMMARY

In the chip antenna disclosed in JP 2019-213138 A, directionality of a signal to be transmitted is determined according to a direction in which a current flows. For example, a current flows in parallel to a substrate plane, and therefore typical chip antennas have difficulty in forming substantially equal directionality of signals with respect to an entire circumferential direction of the substrate plane.

Hence, the present invention has been made in light of the above problem, and an object of the present invention is to form substantially equal directionality of signals with respect to an entire circumferential direction of a substrate plane using a simple configuration.

To solve the above described problem, according to an aspect of the present invention, there is provided an antenna device comprising: a chip antenna arranged on a substrate; and a metal element arranged on the same substrate as the chip antenna, wherein the metal element is arranged such that a longitudinal direction of the metal element is vertical with respect to the substrate in a direction in which a current flows in the chip antenna.

As described above, according to the present invention, it is possible to form substantially equal directionality of signals with respect to an entire circumferential direction of a substrate plane using a simple configuration.

DETAILED DESCRIPTION OF THE EMBODIMENT(S)

Figure 1:
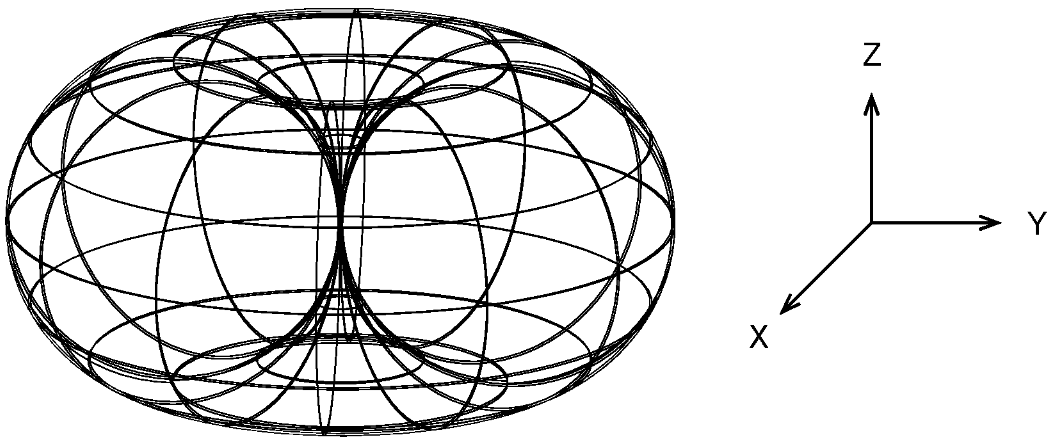
FIG. 1 is a diagram for describing directionality of a signal to be transmitted by a chip antenna.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

1. Embodiment

1.1. Background

As described above, antennas for implementing wireless communication functions in devices are also actively developed.

The above antennas include, for example, a chip antenna arranged on a substrate. The chip antenna is formed using, for example, a high-frequency dielectric ceramics, and is superior in miniaturization and a wide band.

Directionality of a signal to be transmitted by the chip antenna is determined according to a direction of a current flowing in an antenna element similar to typical half-wavelength ($\lambda/2$) dipole antennas and ground-type $\lambda/4$ monopole antennas.

FIG. 1 is a diagram for describing directionality of a signal to be transmitted by the chip antenna.

FIG. 1 illustrates an image that expresses directionality of a transmission signal on three axes of the X axis, the Y axis, and the Z axis about the chip antenna.

Furthermore, FIG. 1 expresses the directionality of the transmission signal in a case where the current flows in the Z axis direction in the chip antenna.

In this case, while the directionality of the transmission signal is substantially equally formed in an entire circumferential direction of the chip antenna on a two-dimensional plane formed by the X axis and the Y axis as illustrated in FIG. 1, the directionality of the transmission signal becomes weak in the Z axis direction.

Furthermore, the chip antenna is generally arranged on a substrate such that an antenna element included in the chip antenna is parallel to the substrate.

That is, a current flows in parallel to a substrate in a typical chip antenna, and therefore directionality of a transmission signal in a direction in which a current flows becomes weak, which makes it difficult to form substantially equal directionality of a transmission signal with respect to an entire circumferential direction of a substrate plane as a result.

However, there is also a case where it is desirable to form substantially equal directionality of a transmission signal with respect to the entire circumferential direction of a substrate plane depending on usage of a device on which a chip antenna is mounted.

For example, a case will be assumed where the substrate on which the chip antenna is arranged is mounted in a movable body such as a vehicle, and the movable body has a wireless communication function.

The above movable body may perform wireless communication with, for example, a portable device carried by a user using the above chip antenna, and perform various control based on a result of the wireless communication.

Examples of the above control include unlocking control of a door installed to the movable body, and start control of an engine.

When, for example, authenticity of the portable device is verified based on a result of wireless communication, the movable body may perform door unlocking control or engine start control.

Furthermore, when, for example, it is estimated based on the result of wireless communication that a distance between the portable device and the movable body is a specified distance or less, the movable body may perform door unlocking control or engine start control.

When the above control is performed, directionality of a signal to be transmitted from the chip antenna is desirably formed substantially equally in the entire circumferential direction of the movable body.

This is because, when the directionality of the transmission signal is not substantially equally formed in the entire circumferential direction of the movable body, there is a probability that wireless communication with the portable device carried by the user becomes impossible depending on a user's position, or quality of wireless communication remarkably lowers.

When, for example, the directionality of the transmission signal is weak in a front-rear direction of the movable body, there is a probability that wireless communication with the portable device carried by the user located in the front-rear direction becomes impossible or quality of wireless communication remarkably lowers.

Furthermore, when, for example, the directionality of the transmission signal is weak in a left-right direction of the movable body, there is a probability that wireless communication with the portable device carried by the user located in the left-right direction becomes impossible or quality of wireless communication remarkably lowers.

In such a case, it is difficult to determine authenticity of the above-described portable device or estimate a distance between the portable device and the movable body, and, as a result, it is difficult to control the door or the engine based on wireless communication with the portable device.

For the above reason, in a case where a chip antenna is mounted on a movable body, directionality of a signal to be transmitted from the chip antenna is desirably formed substantially equally in the entire circumferential direction of the movable body.

However, a substrate on which a chip antenna is arranged is generally arranged in parallel to a floor surface or a ceiling surface of a movable body due to restriction of a space or a design.

In this regard, in a case where a current flowing in the chip antenna flows only in a direction parallel to a substrate plane, directionality of a transmission signal in one of directions of the substrate plane becomes weak, which makes it difficult to form substantially equal directionality of a signal in the entire circumferential direction of the movable body as a result.

The technological idea of the present invention has been conceived focusing on the above point, and forms substantially equal directionality of a signal with respect to an entire circumferential direction of a substrate plane using a simple configuration.

A configuration example of an antenna device 10 according to the present embodiment that achieves the above substantially equal directionality will be described in detail below.

1.2. Configuration Example

Figure 2:
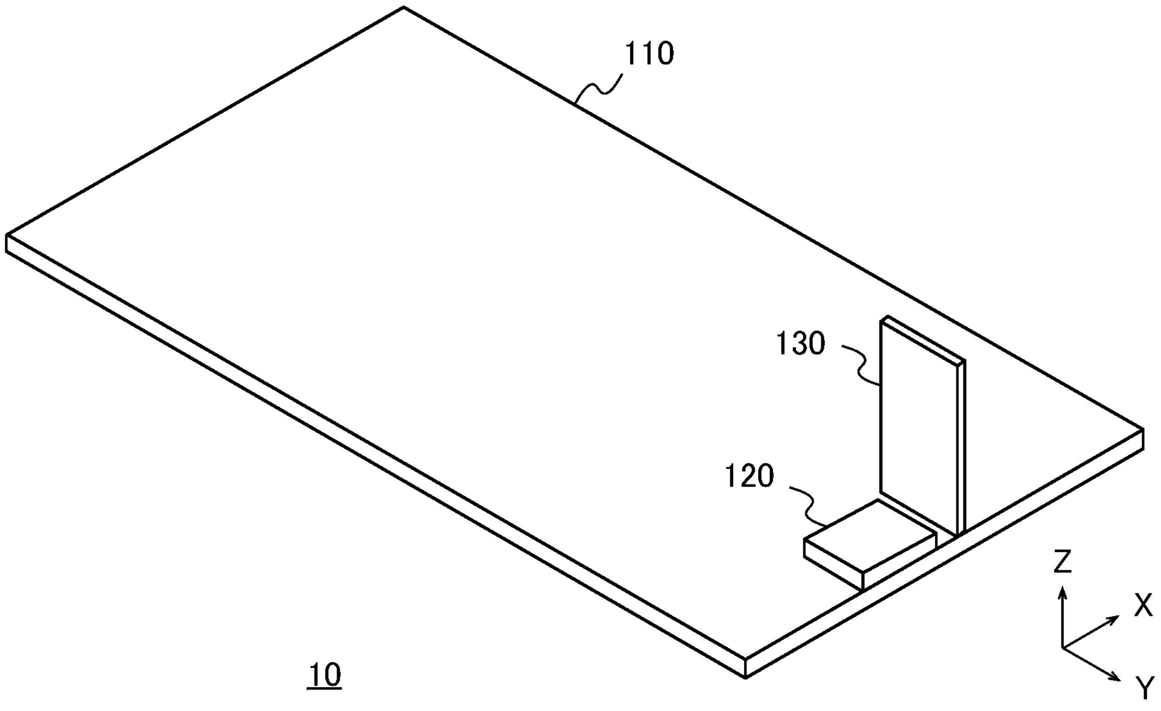
FIG. 2 is a diagram for describing a configuration example of an antenna device 10 according to an embodiment of the present invention.

FIG. 2 is a diagram for describing the configuration example of the antenna device 10 according to the present embodiment. As illustrated in FIG. 2, the antenna device 10 according to the present embodiment includes a chip antenna 120 that is arranged on a substrate 110, and a metal element 130 that is arranged on the same substrate 110 as that of the chip antenna 120.

Note that FIG. 2 does not illustrate other components that may be arranged on the substrate 110.

Furthermore, in FIG. 2, the chip antenna 120 and the metal element 130 are highlighted for ease of description. The dimensions of the chip antenna 120 and the metal element 130 with respect to the substrate 110 are not limited to the example illustrated in FIG. 2.

Furthermore, the same also applies to the shapes of the chip antenna 120 and the metal element 130 according to the present embodiment. The chip antenna 120 and the metal element 130 according to the present embodiment may be formed in different shapes from those illustrated in FIG. 2.

(Chip Antenna 120)

The chip antenna 120 according to the present embodiment transmits a signal that conforms to specific wireless communication standards.

Examples of the above specific wireless communication standards include Ultra-Wide Band (UWB) wireless communication. When ultra-wide band wireless communication is adopted as the specific wireless communication standards, the chip antenna according to the present embodiment transmits an ultra-wide band signal.

On the other hand, the specific wireless communication standards according to the present embodiment are not limited to the above example. The chip antenna 120 according to the present embodiment may transmit, for example, a signal of a Low Frequency (LF) range or a signal of an Ultra High Frequency (UHF) range.

(Metal Element 130)

The metal element 130 according to the present embodiment is formed in, for example, a plate shape using a metal having conductivity.

Furthermore, one of features of the metal element 130 according to the present embodiment is that the metal element 130 is arranged such that a longitudinal direction of the metal element 130 is vertical with respect to the substrate 110 in a direction in which a current flows in (an antenna element included in) the chip antenna 120.

In a case of the example illustrated in FIG. 2, the direction in which the current flows in the chip antenna 120 may be the X axis direction.

In this case, the metal element 130 according to the present embodiment is arranged close to the chip antenna 120 in the X axis direction using the chip antenna 120 as a base point as illustrated in FIG. 2.

According to the above arrangement, the current flowing in the chip antenna 120 runs through the metal element 130, and flows in the longitudinal direction of the metal element 130.

That is, in the antenna device 10 according to the present embodiment, the current flows in one of directions (the X axis direction in the case of the example illustrated in FIG. 2) that is parallel to the substrate 110, and a direction (the Z axis direction in the case of the example illustrated in FIG. 2) that is vertical with respect to the substrate 110.

Accordingly, it is possible to substantially equally form directionality of a signal to be transmitted from the chip antenna 120 in the entire circumferential direction of the substrate 110.

Furthermore, in a case where the antenna device 10 according to the present embodiment is mounted in parallel to the floor surface or the ceiling surface of the movable body, it is possible to substantially equally form directionality of a transmission signal with respect to the entire circumferential direction of the movable body.

Note that it is desirable to arrange the chip antenna 120 and the metal element 130 as close as possible to achieve the above substantially equal directionality.

In a case where, for example, there is structural difficulty in bringing the chip antenna 120 and the metal element 130 according to the present embodiment in contact, a distance between the metal element 130 and the chip antenna 120 may be longer than 0, and the metal element 130 may be arranged close to the chip antenna 120.

Furthermore, the metal element 130 according to the present embodiment may be arranged based on some conditions in addition to the above.

Figure 3:
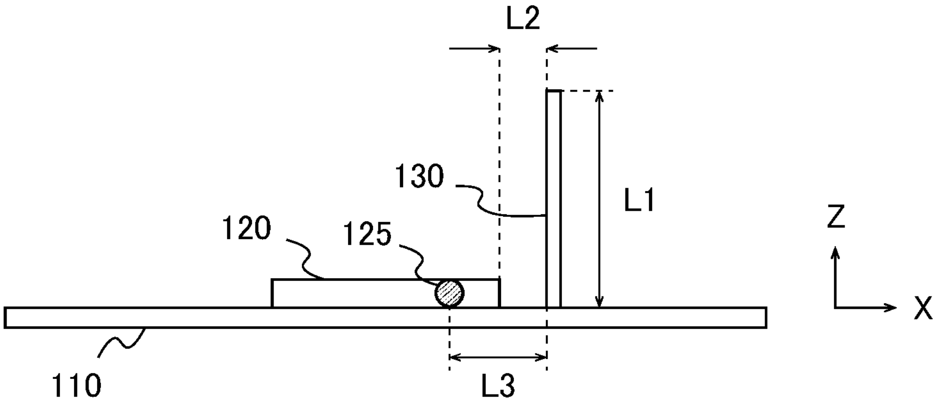
FIG. 3 is a diagram illustrating an example of a case where a chip antenna 120 and a metal element 130 are arranged on the same face of a substrate 110 according to the embodiment.

FIG. 3 is a diagram illustrating an arrangement example of the chip antenna 120 and the metal element 130 according to the present embodiment.

As illustrated in FIG. 3, the metal element 130 according to the present embodiment may be arranged on, for example, the same face as the face of the substrate 110 on which the chip antenna 120 is arranged.

Furthermore, for example, the metal element 130 according to the present embodiment may be formed such that a length L1 in the longitudinal direction is longer than a specified length determined according to a frequency of a signal transmitted by the chip antenna 120.

More specifically, the metal element 130 according to the present embodiment may be formed and arranged such that a sum of a distance L2 between the metal element 130 and the chip antenna 120 and the length L1 in the longitudinal direction is longer than the specified length determined according to the frequency of the signal transmitted by the chip antenna 120.

In this regard, the above specified length may be one fourth of the wavelength of the frequency of the signal transmitted by the chip antenna 120.

That is, the metal element 130 according to the present embodiment may be formed and arranged to satisfy L1+L2>λ/4.

According to the above shape and arrangement, it is possible to increase a component of the current flowing in the vertical direction (the Z axis direction in the case of the example illustrated in FIG. 3) with respect to the substrate 110, and more effectively form substantially equal directionality of a transmission signal in the entire circumferential direction of the substrate 110.

Furthermore, the metal element 130 according to the present embodiment is desirably arranged as close to a feeding point 125 for supplying electric power to the chip antenna 120 as possible.

In a case where, for example, there is structural difficulty in bringing the feeding point 125 and the metal element 130 according to the present embodiment in contact, a distance L3 between the metal element 130 and the feeding point 125 may be longer than 0, and the metal element 130 may be arranged close to the feeding point 125.

Furthermore, the metal element 130 according to the present embodiment may be formed and arranged such that a sum of the distance L3 between the metal element 130 and the feeding point 125 and the length L1 in the longitudinal direction is longer than the specified length determined according to the frequency of the signal transmitted by the chip antenna 120.

The above specified length may be one fourth of the wavelength of the frequency of the signal transmitted by the chip antenna 120.

That is, the metal element 130 according to the present embodiment may be formed and arranged to satisfy L1+L3>λ/4.

According to the above arrangement, it is possible to more effectively increase the component of the current flowing in the vertical direction with respect to the substrate 110.

Note that FIG. 3 illustrates a case where the metal element 130 is arranged on the same face as the face of the substrate 110 on which the chip antenna 120 is arranged. On the other hand, the arrangement of the metal element 130 according to the present embodiment is not limited to the example illustrated in FIG. 3.

Figure 4:
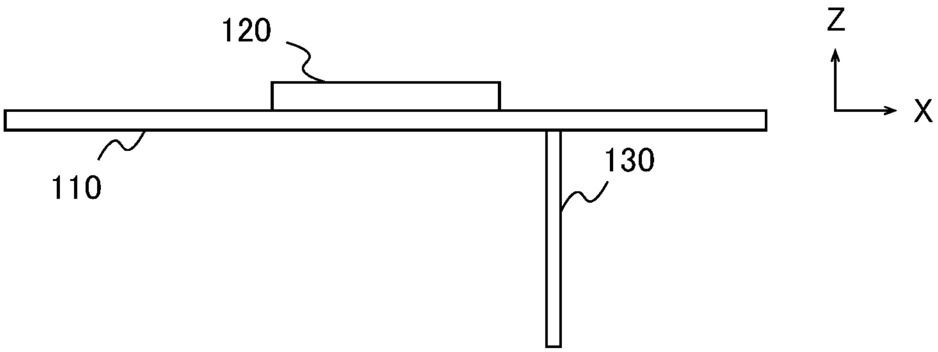
FIG. 4 is a diagram illustrating an example of a case where the chip antenna 120 and the metal element 130 are arranged on opposite faces of the substrate 110 according to the embodiment.

As illustrated in FIG. 4, the metal element 130 according to the present embodiment may be arranged on a face opposite to the face of the substrate 110 on which the chip antenna 120 is arranged.

Even in this case, the length L1 in the longitudinal direction of the metal element 130 or the like satisfies the above-described condition described with reference to FIG. 3, so that it is possible to increase the component of the current flowing in the vertical direction with respect to the substrate 110, and more effectively form substantially equal directionality of a transmission signal in the entire circumferential direction of the substrate 110.

Furthermore, FIGS. 2 to 4 illustrate the cases where the antenna device 10 according to the present embodiment includes the one metal element 130. On the other hand, the number of the metal elements 130 according to the present embodiment is not limited to these examples.

Figure 5:
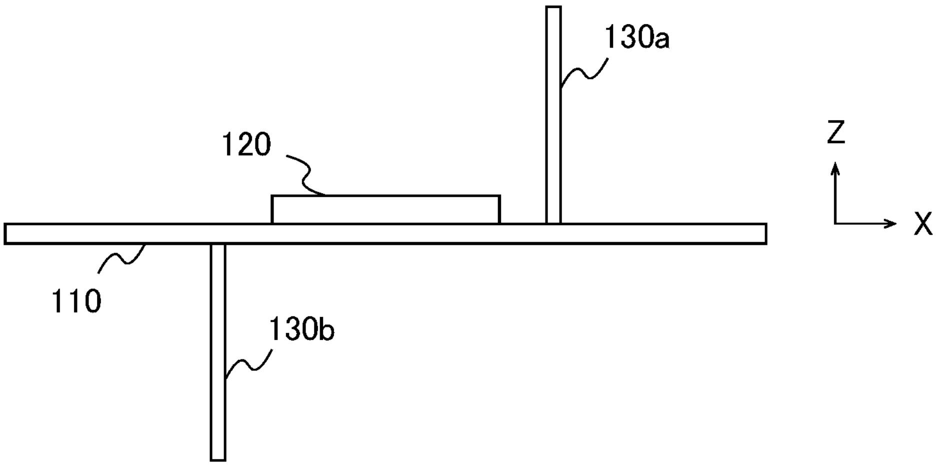
FIG. 5 is a diagram illustrating an arrangement example in a case where the antenna device 10 includes the two metal elements 130 according to the embodiment.

FIG. 5 is a diagram illustrating an arrangement example in a case where the antenna device 10 according to the present embodiment includes the two metal elements 130.

As illustrated in FIG. 5, the metal element 130 according to the present embodiment includes a first metal element 130*a* that is arranged on the same face as the face of the substrate 110 on which the chip antenna 120 is arranged, and a second metal element 130*b* that is arranged on a face opposite to the face of the substrate 110 on which the chip antenna 120 is arranged.

Furthermore, in this case, the first metal element 130*a* and the second metal element 130*b* according to the present embodiment may be arranged at opposite positions about the chip antenna 120.

That is, the first metal element 130*a* and the second metal element 130*b* according to the present embodiment may be arranged symmetrically with respect to a point about the chip antenna 120.

In this case, each of the first metal element 130*a* and the second metal element 130*b* may be arranged such that the length L1 in the longitudinal direction or the like satisfies the above-described condition described with reference to FIG. 3.

According to the above configuration, the current runs through the first metal element 130*a* and the second metal element 130*b*, and flows vertically with respect to the substrate 110, so that it is possible to more effectively form substantially equal directionality of a transmission signal in the entire circumferential direction of the substrate 110.

1.3. Effect

Next, an effect exhibited by the antenna device 10 according to the present embodiment will be described in detail.

Figure 6:
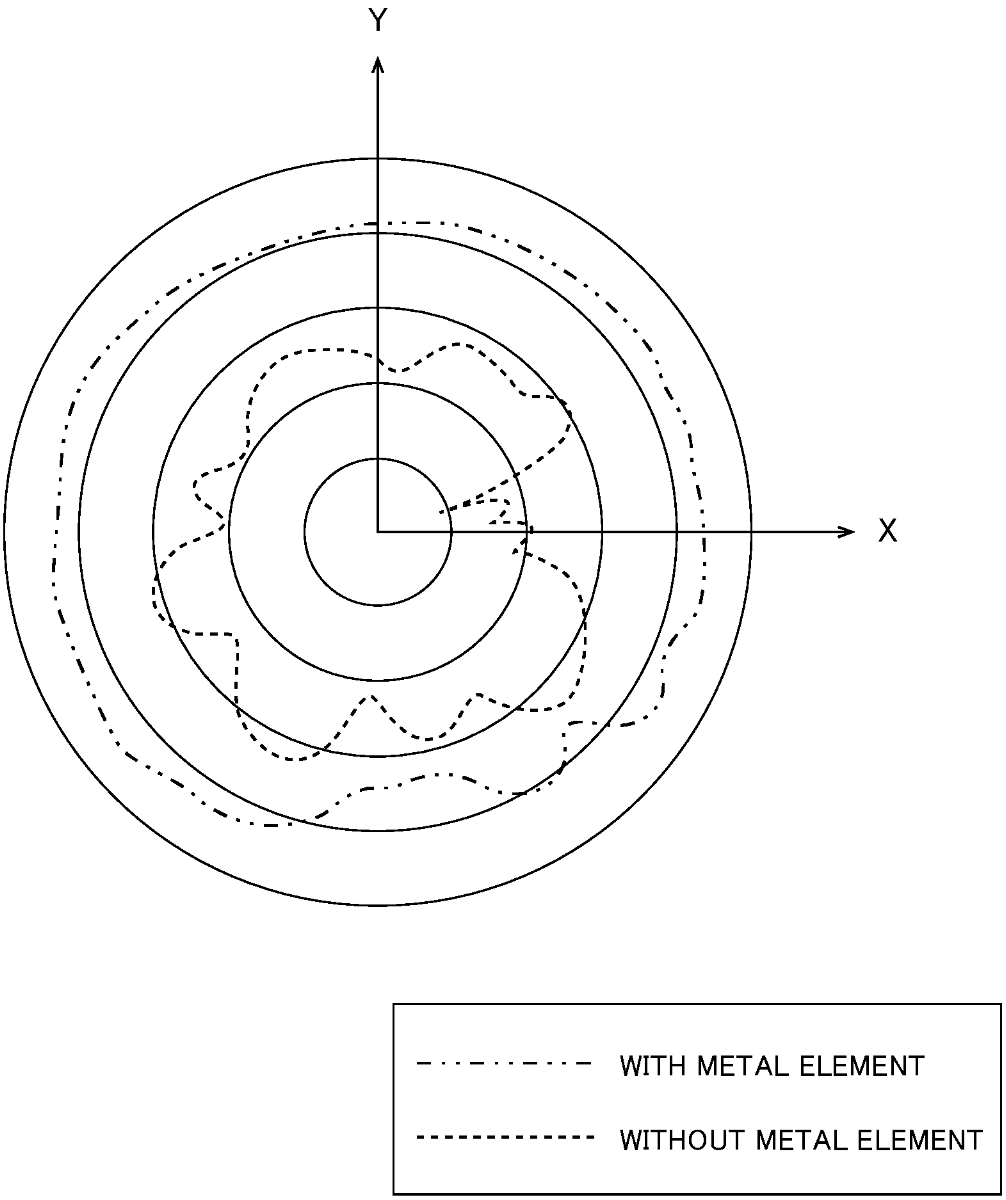
FIG. 6 is a diagram illustrating an image of an effect exhibited by the antenna device 10 including the metal element 130 according to the embodiment.

FIG. 6 is a diagram illustrating an image of an effect exhibited by the antenna device 10 including the metal element 130 according to the present embodiment.

FIG. 6 illustrates a graph for comparing directionality of transmission signals in entire circumferential direction of substrates (planar directions specified by the X axis and the Y axis) between the antenna device 10 that includes the metal element 130 according to the present embodiment and a typical antenna device that does not include the metal element 130 according to the present embodiment.

Referring to FIG. 6, in the case of the typical antenna device that does not include the metal element 130 according to the present embodiment, it is possible to grasp that, for example, the directionality of the transmission signal is not substantially equal in the planar direction specified by the X axis and the Y axis, and the directionality of the transmission signal in the X axis direction in particular is weak.

On the other hand, in the case of the antenna device 10 that includes the metal element 130 according to the present embodiment, it is possible to grasp that the directionality of the transmission signal is substantially equally formed in the planar direction specified by the X axis and the Y axis, and the transmission signal reaches farther than that of the typical antenna device that does not include the metal element 130 according to the present embodiment.

As described above, the antenna device 10 that includes the metal element 130 according to the present embodiment can form substantially equal directionality of signals with respect to the entire circumferential direction of the substrate plane using a simple configuration.

2. Supplement

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

What is claimed is:

1. An antenna device comprising:

a chip antenna arranged on a substrate; and a metal element arranged on the same substrate as the chip antenna, wherein the metal element is arranged such that a longitudinal direction of the metal element is vertical with respect to the substrate in a direction in which a current flows in the chip antenna.

2. The antenna device according to claim 1, wherein the metal element is formed such that a length in the longitudinal direction of the metal element is longer than a specified length determined according to a frequency of a signal transmitted by the chip antenna.

3. The antenna device according to claim 2, wherein a distance between the metal element and the chip antenna is longer than 0, and the metal element is arranged close to the chip antenna.

4. The antenna device according to claim 3, wherein the metal element is formed and arranged such that a sum of the distance between the metal element and the chip antenna and the length in the longitudinal direction of the metal element is longer than the specified length determined according to the frequency of the signal transmitted by the chip antenna.

5. The antenna device according to claim 4, wherein the metal element is formed and arranged such that a sum of the distance between the metal element and the chip antenna and the length in the longitudinal direction of the metal element is longer than one fourth of a wavelength of the frequency of the signal transmitted by the chip antenna.

6. The antenna device according to claim 2, wherein a distance between the metal element and a feeding point for supplying electric power to the chip antenna is longer than 0, and the metal element is arranged close to the feeding point.

7. The antenna device according to claim 6, wherein the metal element is formed and arranged such that a sum of a distance between the metal element and the feeding point and the length in the longitudinal direction of the metal element is longer than the specified length determined according to the frequency of the signal transmitted by the chip antenna.

8. The antenna device according to claim 7, wherein the metal element is formed and arranged such that the sum of the distance between the metal element and the feeding point and the length in the longitudinal direction of the metal element is longer than one fourth of a wavelength of the frequency of the signal transmitted by the chip antenna.

9. The antenna device according to claim 1, wherein the metal element is arranged on a face identical to a face of the substrate on which the chip antenna is arranged.

10. The antenna device according to claim 1, wherein the metal element is arranged on a face opposite to a face of the substrate on which the chip antenna is arranged.

11. The antenna device according to claim 1, wherein the metal element includes a first metal element arranged on a face identical to a face of the substrate on which the chip antenna is arranged, and a second metal element arranged on a face opposite to the face of the substrate on which the chip antenna is arranged, and the first metal element and the second metal element are arranged at positions opposite to each other about the chip antenna.

12. The antenna device according to claim 1, wherein the chip antenna transmits an ultra-wide band signal.

* * * * *